(12) United States Patent
Kondo

(10) Patent No.: US 10,963,033 B2
(45) Date of Patent: *Mar. 30, 2021

(54) VARIABLE-FREQUENCY SAMPLING OF BATTERY VOLTAGE TO DETERMINE FUEL GAUGE POWER MODE

(71) Applicant: SEMICONDUCTOR COMPONENTS INDUSTRIES, LLC, Phoenix, AZ (US)

(72) Inventor: Hideo Kondo, Oizumi-machi (JP)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/544,311

(22) Filed: Aug. 19, 2019

(65) Prior Publication Data

US 2019/0369702 A1 Dec. 5, 2019

Related U.S. Application Data

(63) Continuation of application No. 16/059,756, filed on Aug. 9, 2018, now Pat. No. 10,423,211, which is a continuation of application No. 14/684,635, filed on Apr. 13, 2015, now Pat. No. 10,095,297.

(51) Int. Cl.
*G06F 1/32* (2019.01)
*G06F 1/3212* (2019.01)
*H02J 7/00* (2006.01)
*G06F 1/3287* (2019.01)

(52) U.S. Cl.
CPC .......... *G06F 1/3212* (2013.01); *H02J 7/0047* (2013.01); *H02J 7/0063* (2013.01); *G06F 1/3287* (2013.01); *H02J 7/0048* (2020.01); *H02J 2007/0067* (2013.01); *Y02D 10/00* (2018.01)

(58) Field of Classification Search
CPC ........................................................ G06F 1/32
See application file for complete search history.

(56) References Cited

U.S. PATENT DOCUMENTS

| | | |
|---|---|---|
| 5,268,630 A | 12/1993 | Bhagwat et al. |
| 10,095,297 B2 | 10/2018 | Kondo |
| 2011/0112781 A1 | 5/2011 | Anderson et al. |
| 2011/0153241 A1 | 6/2011 | Abe |
| 2011/0316548 A1* | 12/2011 | Ghantous ............. G01R 31/388 324/427 |
| 2012/0049802 A1 | 3/2012 | Barsukov et al. |
| 2012/0203484 A1 | 8/2012 | Ando et al. |
| 2013/0278221 A1* | 10/2013 | Maeda .................... B60L 8/003 320/134 |

* cited by examiner

*Primary Examiner* — Paul B Yanchus, III
(74) *Attorney, Agent, or Firm* — Adam R. Stephenson, Ltd.

(57) ABSTRACT

A system for conserving power in an electronic device, in some embodiments, comprises: a battery to supply power to the electronic device; and a fuel gauge coupled to the battery and capable of operating in any of a plurality of power modes, wherein the fuel gauge selects its own power mode based on a repeated, variable-frequency sampling of a voltage provided by said battery.

18 Claims, 5 Drawing Sheets

VARIABLE-FREQUENCY SAMPLING OF BATTERY VOLTAGE TO DETERMINE FUEL GAUGE POWER MODE

CROSS REFERENCE TO RELATED APPLICATIONS

This application is a continuation application of the earlier U.S. Utility patent application to Kondo entitled "Variable-Frequency Sampling of Battery Voltage to Determine Fuel Gauge Power Mode," application Ser. No. 16/059,756, filed Aug. 9, 2018, now pending, which application is a continuation application of the earlier U.S. Utility patent application to Kondo entitled "Variable-Frequency Sampling of Battery Voltage to Determine Fuel Gauge Power Mode," application Ser. No. 14/684,635, filed Apr. 13, 2015, now issued as U.S. Pat. No. 10,095,297, the disclosures of each of which are hereby incorporated entirely herein by reference.

BACKGROUND

Consumer electronics—such as smart phones, laptops, tablets, video cameras and handheld game consoles—are typically powered by batteries. Although such batteries are generally rechargeable, minimizing battery consumption has long been a primary design goal for such products. Extended battery life prolongs the amount of time between re-charging sessions, thus delivering a significantly enhanced user experience.

SUMMARY

At least some of the embodiments disclosed herein are directed to a system for conserving power in an electronic device, comprising: a battery to supply power to the electronic device; and a fuel gauge coupled to the battery and capable of operating in any of a plurality of power modes, wherein the fuel gauge selects its own power mode based on a repeated, variable-frequency sampling of a voltage provided by said battery. At least some of these embodiments may be supplemented using one or more of the following concepts, in any order or combination: wherein the fuel gauge repeatedly samples said voltage at a sampling frequency corresponding to a currently-enabled power mode of the fuel gauge; wherein the power mode is selected from at least two different power modes, and wherein a higher one of said at least two different power modes is associated with more frequent sampling of said voltage by the fuel gauge, and wherein a lower one of said at least two different power modes is associated with less frequent sampling of said voltage by the fuel gauge; wherein said power mode is selected from the group consisting of: a stand by mode, a relax mode, an operation mode and an active mode; wherein the fuel gauge switches to a higher power mode than its currently-enabled power mode if said repeated sampling demonstrates a change in said voltage that meets or exceeds a voltage change threshold; wherein the fuel gauge maintains its currently-enabled power mode if said repeated sampling demonstrates a change in said voltage that fails to meet or exceed a voltage change threshold; wherein the fuel gauge switches to a lower power mode than its currently-enabled power mode if said repeated sampling demonstrates no change in said voltage; wherein the electronic device is selected from the group consisting of: a smart phone, a tablet, a laptop, a digital camera, and a handheld game console; wherein the fuel gauge selects its power mode based on four consecutive samples of said voltage.

At least some embodiments are directed to an electronic device, comprising: a battery that powers at least part of the electronic device; and a fuel gauge, coupled to the battery, that autonomously selects a power mode in which to operate based on a sampling of a voltage provided by said battery, wherein the fuel gauge selects said power mode based on a degree to which said voltage swings between samples and based on how often said voltage changes. At least some of these embodiments may be supplemented with one or more of the following concepts, in any order and in any combination: wherein, while operating within a single fuel gauge power mode, the fuel gauge varies a sampling frequency at which the fuel gauge samples said voltage; further comprising a programmable register that stores a voltage change threshold against which the fuel gauge compares said degree to which the voltage swings between samples and that stores a rate of change threshold against which the fuel gauge compares how often said voltage changes, and wherein the fuel gauge uses said comparisons to select said power mode; wherein a sampling frequency at which the fuel gauge samples said voltage is based on a currently-enabled power mode of the fuel gauge; wherein, if the fuel gauge determines that said voltage does not change over a predetermined number of consecutive samples, the fuel gauge switches to a lower power mode than its currently-enabled power mode; wherein, if the greatest battery voltage swing over a predetermined number of consecutive voltage samples is less than a voltage change threshold, or if the number of times that the battery voltage changes over said predetermined number of consecutive voltage samples is less than a rate of change threshold, the fuel gauge maintains its currently-enabled power mode; wherein, if the greatest battery voltage swing over a predetermined number of consecutive voltage samples is equal to or greater than a voltage change threshold, and if the number of times that the battery voltage changes over said predetermined number of consecutive voltage samples is equal to or greater than a rate of change threshold, the fuel gauge switches to a higher power mode than its currently-enabled power mode.

At least some embodiments are directed to a method for conserving power, comprising: repeatedly sampling a voltage provided by a battery housed within an electronic device; and selecting a fuel gauge power mode based on said repeated sampling, wherein said repeated sampling is performed at a variable sampling frequency that depends on a currently-enabled power mode of the fuel gauge, wherein said selecting is performed by the fuel gauge. At least some of these embodiments may be supplemented by one or more of the following concepts, in any order and in any combination: wherein said fuel gauge power mode is selected from the group consisting of: a standby mode, a relaxed mode, an operation mode, and an active mode; wherein the fuel gauge samples said voltage at a first sampling frequency during the relaxed mode, at a second sampling frequency during the operation mode, and at a third sampling frequency during the active mode, and wherein the second sampling frequency is greater than the first sampling frequency but less than the third sampling frequency; further comprising varying the sampling frequency while operating within a single fuel gauge power mode.

BRIEF DESCRIPTION OF THE DRAWINGS

There are disclosed in the drawings and in the following description systems and methods for variable-frequency sampling of an electronic device battery voltage to determine a fuel gauge power mode. In the drawings.

Figure 1:
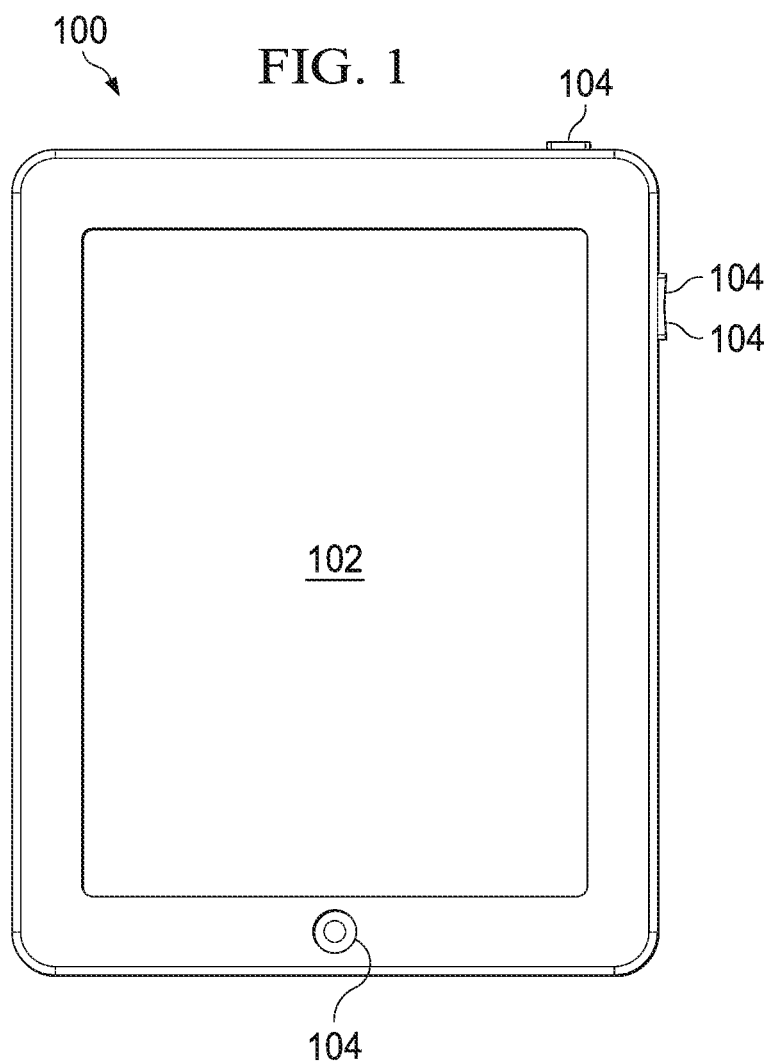
FIG. 1 is a front view of an illustrative electronic device.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems for variable-frequency sampling of an electronic device battery voltage to determine a fuel gauge power mode. An illustrative electronic device implementing the techniques disclosed herein contains a battery supplying power to the components of the electronic device and a fuel gauge that monitors the battery. The fuel gauge is capable of operating in numerous power modes (e.g., standby mode, relaxed mode, operating mode, active mode), each one of which causes the fuel gauge to consume different amounts of power. The fuel gauge selects its power mode based on a sampling of the voltage provided by the battery. The fuel gauge samples this voltage at a variable frequency, with the precise frequency depending on the power mode in which the fuel gauge is currently operating and changing as the fuel gauge power mode changes. Based on the voltage swings between samples and on how often the voltage changes, the fuel gauge either switches to a lower power mode, stays in its currently-enabled power mode, or switches to a higher power mode.

For example, while the fuel gauge is in a standby mode, it may sample the battery voltage once per minute; in a relaxed mode, once every 20 seconds; in an operating mode, once every 10 seconds; and in an active mode, four times per second. If, while in any of these power modes, the fuel gauge consecutively samples the battery voltage a predetermined number of times and determines that there is no voltage change, the fuel gauge autonomously switches to a lower power mode (unless the fuel gauge is already in the lowest available power mode, such as a standby mode). If the fuel gauge consecutively samples the battery voltage the predetermined number of times and determines that there is at least one voltage change but that the greatest voltage change (in either direction) fails to meet or exceed a voltage change threshold, the fuel gauge remains in its currently-enabled power mode. Similarly, if the fuel gauge consecutively samples the battery voltage the predetermined number of times and determines that there is a threshold-exceeding voltage change but that the battery voltage does not change often enough to meet or exceed a rate of change threshold, the fuel gauge remains in its currently-enabled power mode. Finally, if the fuel gauge determines that there is at least one voltage change and that the greatest of these voltage changes meets or exceeds the voltage change threshold, and further if the fuel gauge determines that the battery voltage changes often enough to meet or exceed a rate of change threshold, the fuel gauge switches to a higher power mode (unless the fuel gauge is already in the highest available power mode, such as an active mode). Numerous variations and permutations of this technique are contemplated and included within the scope of the disclosure.

In some embodiments, the sampling frequency may vary even within the same fuel gauge power mode. For example, referring again to the foregoing example, if the fuel gauge determines that there is an increase in voltage variation (i.e., greater voltage swings between samples and/or a greater percentage of samples indicating voltage changes), but the voltage variation is not significant enough to warrant switching modes, the fuel gauge may remain in its currently-enabled power mode but it may increase or decrease its sampling frequency to account for the increased variation in battery voltage.

FIG. 1 is a front view of an illustrative consumer electronic device 100 that implements the systems and methods described herein. The electronic device 100 may be any suitable device that uses a battery (e.g., a lithium ion battery). Non-limiting examples of such electronic devices include smart phones (e.g., APPLE iPHONE®, SAMSUNG GALAXY NOTE®), tablets (e.g., APPLE iPAD®, AMAZON KINDLE®), laptops, video cameras (including camcorders), and handheld game consoles (e.g., SONY PLAYSTATION VITA®). Other such devices are contemplated and included within the scope of this disclosure. The illustrative consumer electronic device 100 includes a display screen 102 that is preferably a touch screen. It further includes various tactile input devices 104, such as buttons arranged in various locations around the exterior of the electronic device 100. Additional input and output devices, such as microphones and speakers, also may be incorporated within such a device.

Figure 2:
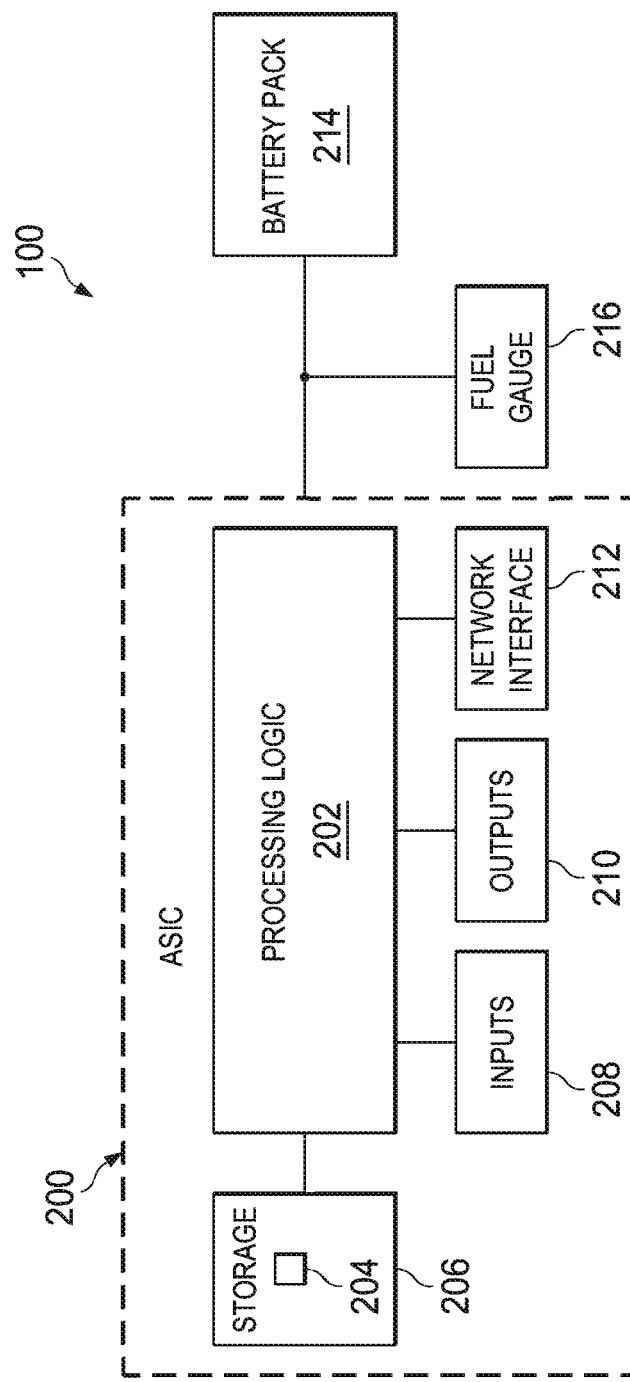
FIG. 2 is a block diagram of at least some components within an electronic device.

FIG. 2 is a block diagram of components within the illustrative consumer electronic device 100. The electronic device 100 includes an application-specific integrated circuit (ASIC) 200 comprising processing logic 202 (e.g., a microprocessor), storage 206 coupled to the processing logic 202 and comprising software code 204 (e.g., an operating system or applications), input features 208 (e.g., buttons, touch screen, microphone), output features 210 (e.g., display screen that may be the same as the touch screen, speaker, haptic feedback motor), and a network interface 212 for communicating with other devices (e.g., via the Internet). Other components may be included on the ASIC 200. The ASIC 200 is powered by a battery pack ("battery") 214. A fuel gauge 216 couples to the battery 214. In at least some embodiments, the ASIC 200, the fuel gauge 216 and the battery 214 couple to each other in a parallel configuration, so that the ASIC 200 may receive power from the battery 214 while the fuel gauge 216 monitors the output of the battery 214. Further, in some embodiments the ASIC 200 may be replaced by a plurality of ASICs or other circuitry. The techniques disclosed herein may be implemented in any electronic device in which any suitable type of load (here, the ASIC 200) is powered by the battery 214. In operation, and as described in greater detail with respect to FIG. 3, the fuel gauge 216 monitors the voltage output by the battery 214. As explained above, the fuel gauge 216 autonomously selects its own power mode based on the battery voltage fluctuation—that is, based on the battery voltage swings between samples as well as the frequency with which the battery voltage changes.

Figure 3:
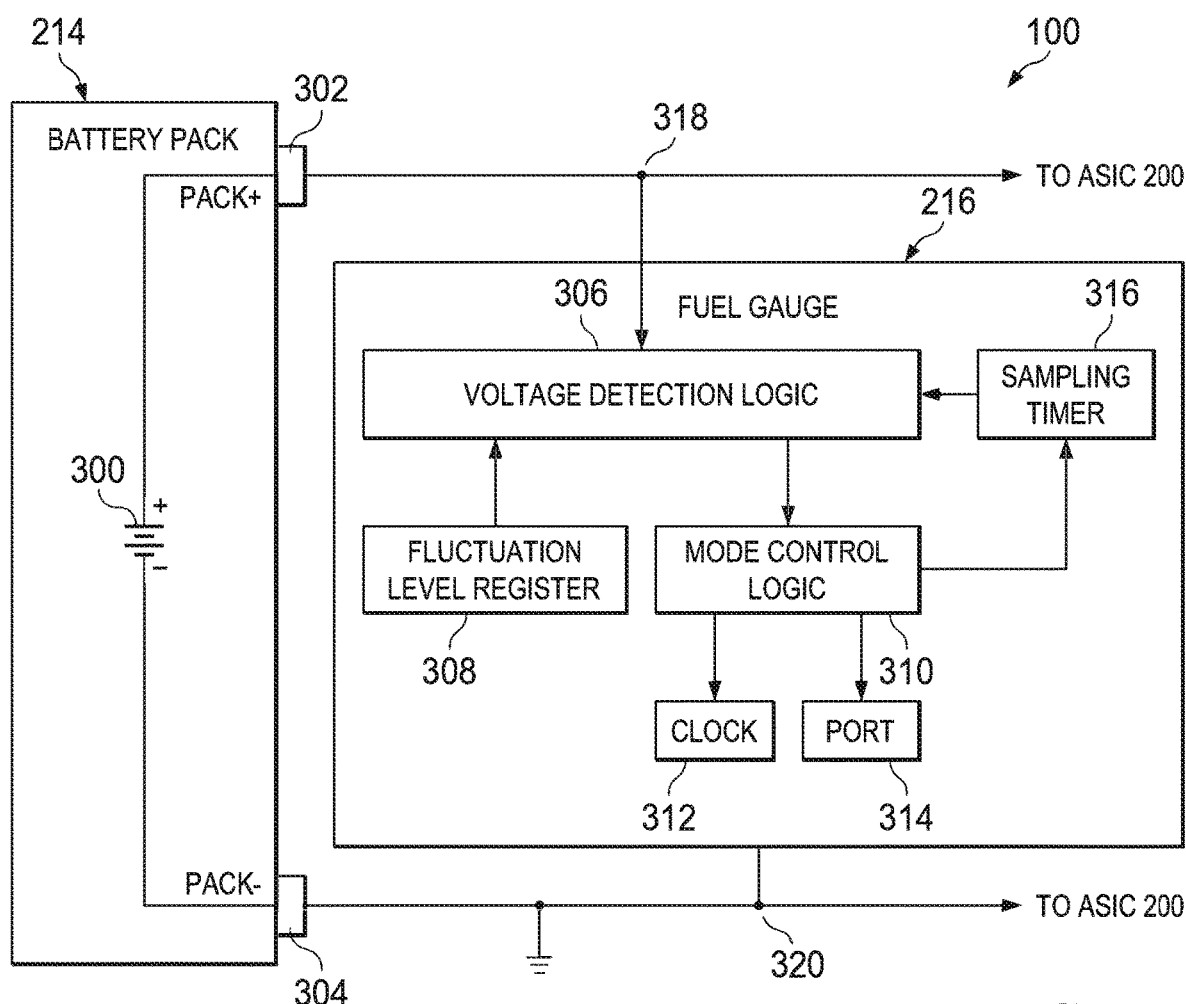
FIG. 3 is a block diagram of at least some components within a fuel gauge of the electronic device.

FIG. 3 is a block diagram of components within the consumer electronic device 100 and, more particularly, within the fuel gauge 216. The block diagram of FIG. 3 is conceptual in nature, meaning that at least some of the blocks represent functions performed by the various parts of the electronic device 100. The actual circuit logic used to implement the functions represented by the blocks may vary depending on design considerations and preferences and will be readily known to or determined by one of ordinary skill in the art.

Referring to FIG. 3, the battery 214 contains a voltage source 300 that creates a potential across terminals 302, 304. The terminal 302 provides a voltage to node 318, which couples to the fuel gauge 216 and to the ASIC 200. The terminal 304 couples to ground and to node 320, which couples to the fuel gauge 216 and the ASIC 200. The fuel gauge 216 comprises voltage detection logic 306, a programmable voltage fluctuation level register 308, mode control logic 310, a clock 312 and port 314, and a sampling timer 316. The programmable register 308 contains the voltage change threshold value and the rate of change threshold value, described above. In operation, the voltage detection logic 306 samples the voltage present at node 318 (i.e., the battery voltage) at a sampling frequency that varies according to the currently-enabled mode of the fuel gauge 216. In at least some embodiments, when the fuel gauge 216 is in a standby mode, the voltage detection logic 306 may sample the battery voltage once per minute; in a relaxed mode, once every 20 seconds; in an operating mode, once every 10 seconds; and in an active mode, four times per second, although the scope of disclosure is not limited to these sampling frequencies for each power mode, nor is the scope of disclosure limited to the use of a single sampling frequency in individual power modes.

If, upon consecutively sampling the voltage a predetermined number of times, the logic 306 determines that the voltage has not changed at all, the fuel gauge 216 switches to a lower power mode. If the logic 306 determines that the voltage has changed, but not by the voltage change threshold stored in the register 308, or if the logic 306 determines that the voltage has changed by the voltage change threshold but that the voltage has not changed as often as required by the rate of change threshold, the logic 306 concludes that there is not enough variation in the battery voltage to warrant an upward power mode switch, and it remains in its currently-enabled power mode. If, however, the logic 306 determines that the battery voltage has changed by the voltage change threshold, and if the logic 306 further determines that the voltage has changed often enough (by any suitable amount, or by some additional minimum threshold programmed into the register 308) to meet or exceed the rate of change threshold, the logic 306 issues a signal to the mode control logic 310 to increase the power mode of the fuel gauge 216.

Figure 4:
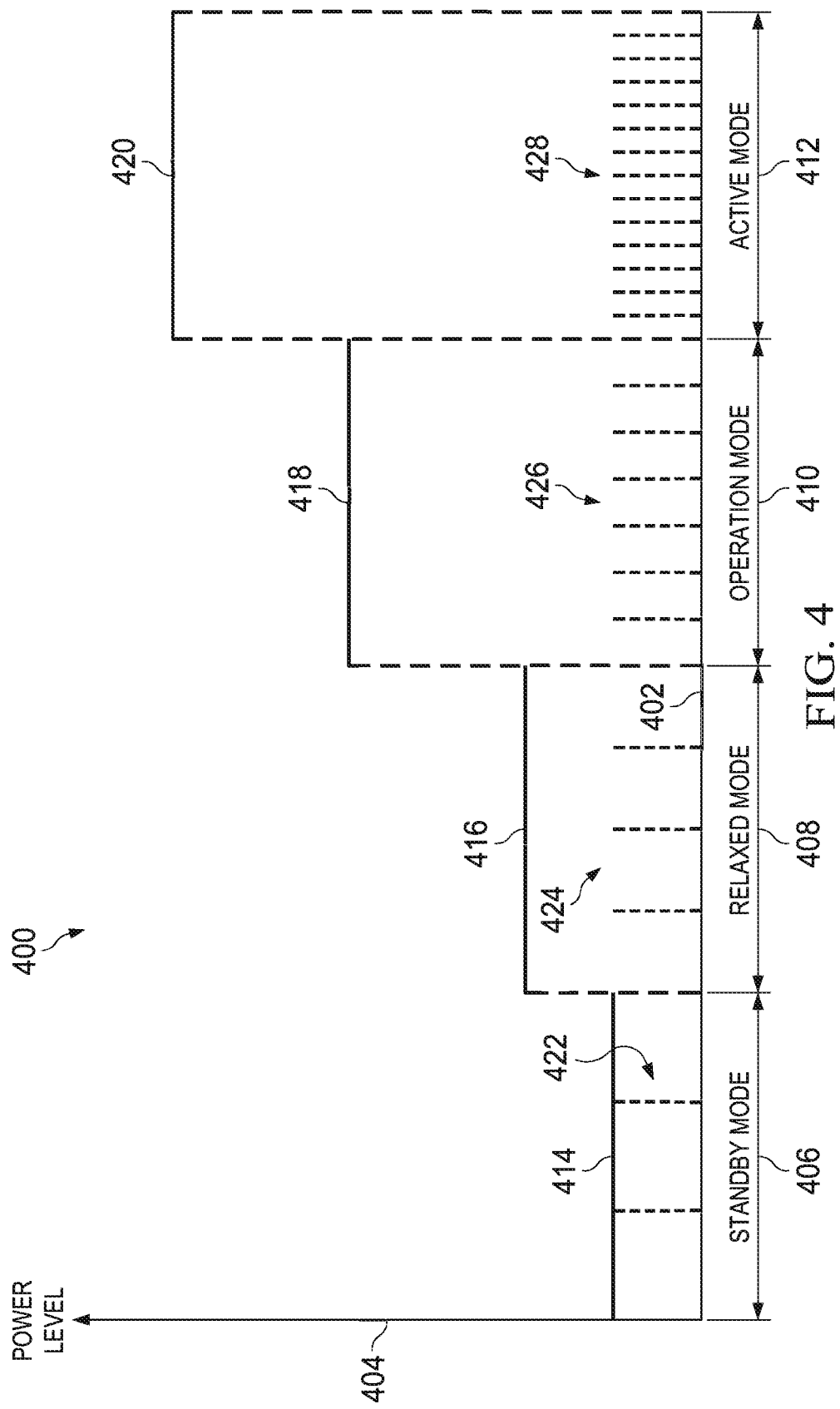
FIG. 4 is a graph illustrating a variable frequency voltage sampling scheme.

FIG. 4 is a graph 400 illustrating a variable frequency voltage sampling scheme. The graph 400 plots different power modes on the x-axis 402 and power level on the y-axis 404. Specifically, graph 400 shows a standby mode 406, a relaxed mode 408, an operation mode 410, and an active mode 412. During the standby mode 406, the power level 414 is relatively low; during the relaxed mode 408, the power level 416 is increased; during the operation mode 410, the power level 418 is further increased; and during the active mode 412, the power level 420 is highest. The sampling frequency at which the fuel gauge samples the battery voltage varies among these power modes. During standby mode 406, numeral 422 indicates a relatively low sampling frequency; during relaxed mode 408, numeral 424 indicates an increased sampling frequency; during the operation mode 410, the sampling frequency 426 is further increased; and during the active mode 412, the sampling frequency 428 is relatively high. Specific, illustrative sampling frequencies are provided above and thus are not reproduced here.

Figure 5:
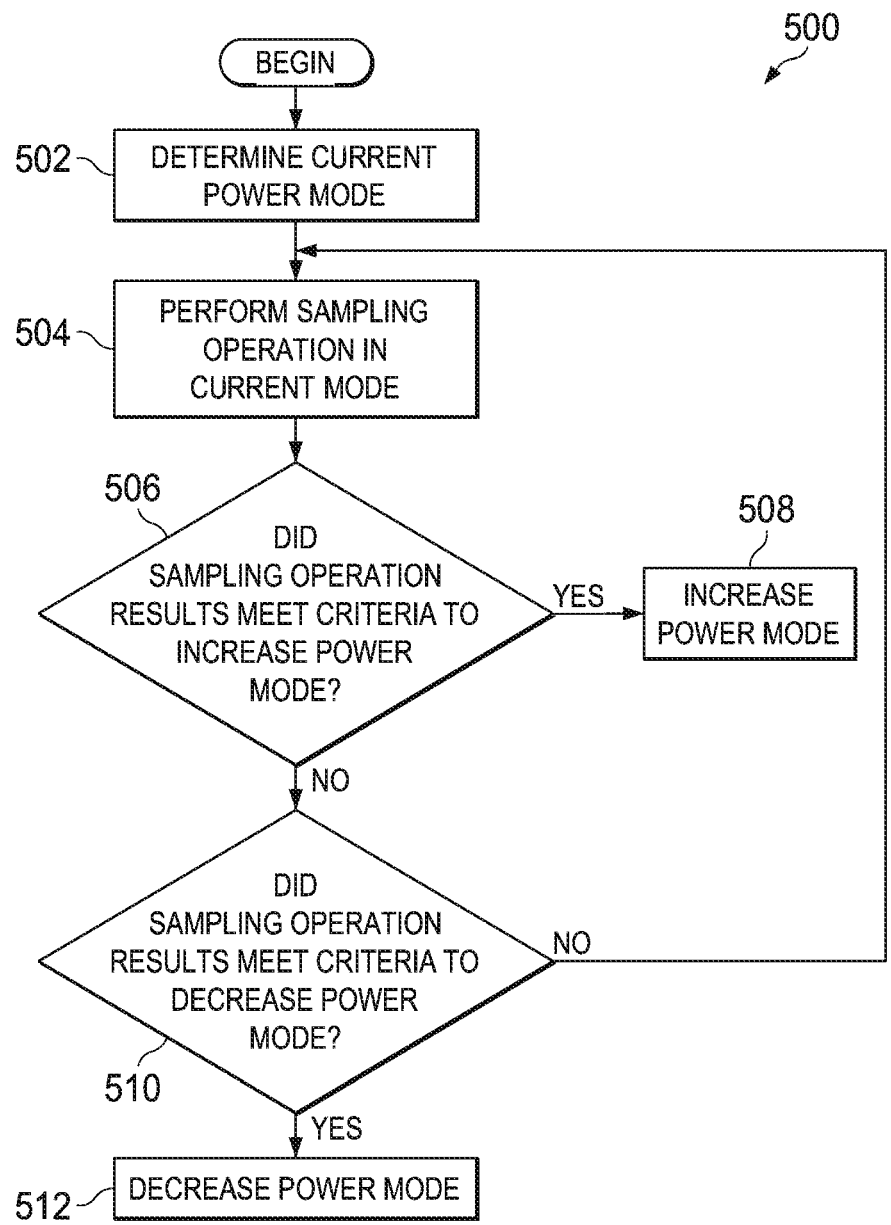
FIG. 5 is a flow diagram of an illustrative method usable to implement the techniques disclosed herein.

FIG. 5 is a flow diagram of an illustrative method 500 usable to implement the techniques disclosed herein. The method 500 begins by determining a current fuel gauge power mode (step 502). The method 500 includes performing a sampling operation in the current power mode (step 504). A sampling operation is a sampling of the battery voltage a predetermined number of times at a predetermined sampling frequency, where the sampling frequency is determined based at least on the current power mode of the fuel gauge. The method 500 then includes determining whether the results of the sampling operation met the criteria for increasing the fuel gauge power mode (step 506). If so, the fuel gauge autonomously increases its power mode (step 508). Otherwise, the method 500 comprises determining whether the results of the sampling operation met the criteria for decreasing the fuel gauge power mode (step 510). If so, the fuel gauge autonomously decreases its power mode (step 512). Otherwise, the currently-enabled power mode is maintained. Control of the method 500 then returns to step 504, as is the case after completion of steps 508 and 512. The method 500 may be modified as desired—for example, to include additional steps, delete steps, or rearrange steps.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

What is claimed is:

1. A fuel gauge comprising:
   a voltage detection logic circuit coupled with a sampling timer;
   wherein the voltage detection logic circuit, in response to the sampling timer, is configured to repeatedly sample a voltage from a battery to measure a voltage swing and a rate of change of the voltage and generate data values that correspond with the voltage swing and the rate of change of the voltage; and
   wherein the voltage detection logic circuit is configured to select a power mode based on a combination of the data values corresponding with the voltage swing and the data values corresponding with the rate of change of the voltage.

2. The fuel gauge of claim 1, wherein the voltage detection logic circuit, in response to the sampling timer, is configured to repeatedly sample the voltage at a sampling frequency corresponding to a power mode of the fuel gauge.

3. The fuel gauge of claim 2, wherein the power mode is selected from at least two different power modes, and wherein one of the at least two different power modes is associated with more frequent sampling of the voltage by the voltage detection logic circuit, and wherein another one of the at least two different power modes is associated with less frequent sampling of the voltage by the voltage detection logic circuit.

4. The fuel gauge of claim 1, wherein a mode control logic circuit is configured to change a power mode from one of a stand by mode, a relax mode, an operation mode or an active mode.

5. The fuel gauge of claim 1, wherein the fuel gauge is configured to maintain its power mode if the data values corresponding with the voltage swing fails to meet or exceed a voltage swing threshold.

6. The fuel gauge of claim 1, wherein the fuel gauge is configured to switch to a lower power mode if the data values corresponding with the voltage swing are zero.

7. The fuel gauge of claim 1, wherein the fuel gauge is configured to couple with an electronic device selected from the group consisting of: a smart phone, a tablet, a laptop, a digital camera, and a handheld game console.

8. The fuel gauge of claim 1, wherein the fuel gauge is configured to maintain a power mode when one of the following is true:
the data values corresponding to the voltage swing are less than a voltage swing threshold and the data values corresponding with the rate of change of the voltage are greater than a rate of change threshold; or
the data values corresponding with the rate of change of the voltage are less than the rate of change threshold and the data values corresponding with the voltage swing are greater than the voltage swing threshold.

9. A fuel gauge, comprising:
a voltage detection logic circuit coupled with a sampling timer;
wherein the voltage detection logic circuit is configured to repeatedly sample a voltage from a battery and measure a voltage swing and a rate of change of the voltage and generate data values that correspond with the voltage swing and the rate of change of the voltage;
wherein a sampling frequency provided by the sampling timer at which the voltage detection logic is configured to sample the voltage is based on a currently-enabled power mode of the fuel gauge.

10. The fuel gauge of claim 9, wherein, while operating within a single fuel gauge power mode, the sampling timer varies a sampling frequency at which the voltage detection logic samples the voltage.

11. The fuel gauge of claim 9, further comprising a fluctuation level register memory coupled with the voltage detection logic circuit.

12. The fuel gauge of claim 9, wherein the mode control logic circuit is configured to change the power mode from one of a stand by mode, a relax mode, an operation mode or an active mode.

13. The fuel gauge of claim 9, wherein, if the voltage detection logic circuit determines that the voltage does not change over a predetermined number of consecutive samples, it is configured to send a signal to a mode control logic circuit coupled to the voltage detection logic circuit to switch to a lower power mode.

14. A method for conserving power, comprising:
repeatedly sampling a voltage using a voltage detection logic circuit coupled with a sampling timer;
measuring a voltage swing and a rate of change of the voltage using the voltage detection logic circuit;
generating data values that correspond with the voltage swing and the rate of change of the voltage; and
selecting a power mode based on a combination of the data values corresponding with the voltage swing and the data values corresponding with the rate of change of the voltage.

15. The method of claim 14, wherein a fuel gauge power mode is selected from the group consisting of: a standby mode, a relaxed mode, an operation mode, and an active mode.

16. The method of claim 15, wherein the voltage detection logic circuit, using the sampling timer, samples the voltage at a first sampling frequency during the relaxed mode, at a second sampling frequency during the operation mode, and at a third sampling frequency during the active mode, and wherein the second sampling frequency is greater than the first sampling frequency but less than the third sampling frequency.

17. The method of claim 14, further comprising varying the sampling frequency while operating within a single fuel gauge power mode.

18. The method of claim 14, wherein, if the data values corresponding with a greatest voltage swing over a predetermined number of consecutive voltage samples are equal to or greater than a voltage swing threshold and if the data values corresponding with the rate of change of the voltage over the predetermined number of consecutive voltage samples are equal to or greater than a rate of change threshold, a mode control logic circuit coupled to the voltage detection logic circuit is configured to switch to a higher power mode.

* * * * *